No. 894,293. PATENTED JULY 28, 1908.
E. C. SHAW.
VEHICLE WHEEL RIM.
APPLICATION FILED FEB. 20, 1907.
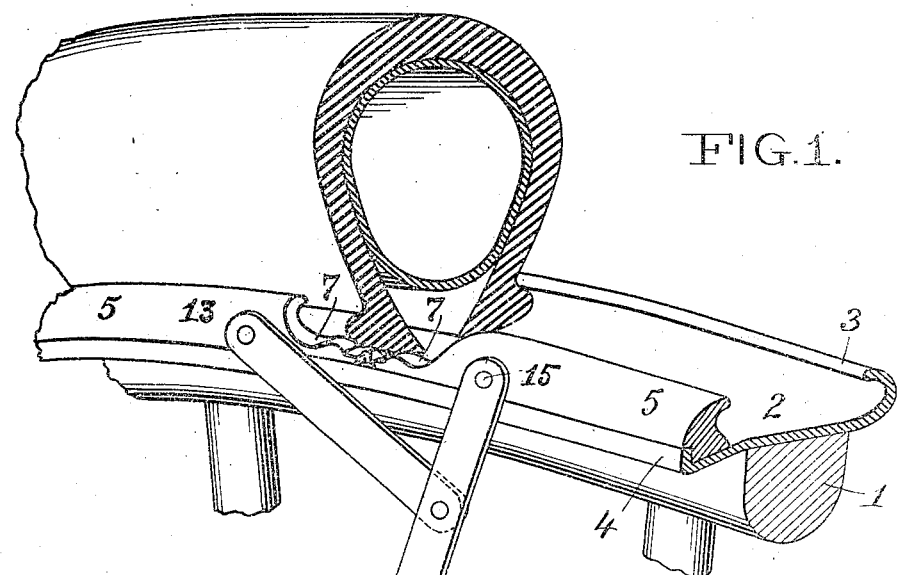
FIG. 1.
FIG. 2.
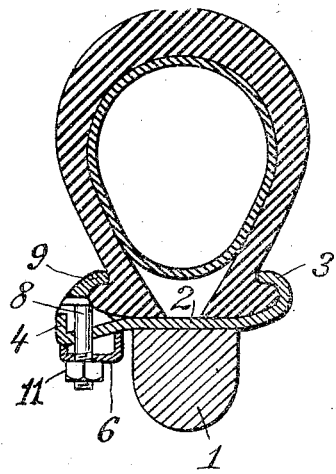
FIG. 3.
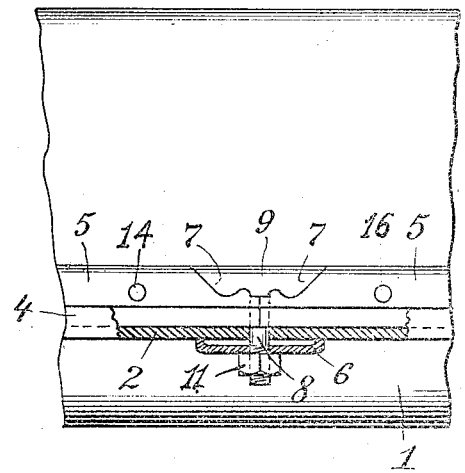
FIG. 4.
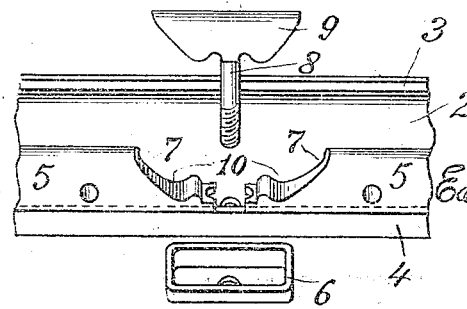
WITNESSES:
Walter F. Thompson
Oliver Williams
INVENTOR
Edwin Copland Shaw
BY
Edward Davis
ATTORNEY

UNITED STATES PATENT OFFICE.

EDWIN COUPLAND SHAW, OF AKRON, OHIO, ASSIGNOR TO B. F. GOODRICH COMPANY, OF AKRON, OHIO, A CORPORATION OF OHIO.

VEHICLE-WHEEL RIM.

No. 894,293.  Specification of Letters Patent.  Patented July 28, 1908.

Application filed February 20, 1907. Serial No. 358,464.

*To all whom it may concern:*

Be it known that I, EDWIN COUPLAND SHAW, a citizen of the United States, residing at the city of Akron, county of Summit, and State of Ohio, have invented certain new and useful Improvements in Vehicle-Wheel Rims, of which the following is a specification, reference being had to the accompanying drawings, which form a part thereof.

My invention relates to that class of vehicle wheel rims designed for use with tires of resilient materials, and more particularly to rims for use with detachable tires.

I have described and claimed in a companion application an improved vehicle wheel rim having one tire flange permanently mounted upon the channel-iron, an opposing tire flange mounted upon a removable split ring, and means for securing locking engagement between the channel-iron and the removable ring.

The object of my invention described and claimed in the present application is to provide a useful modification of the means for securing locking engagement between the channel-iron and the flange-bearing removable ring. I accomplish this object by means of a bolt having a head formed into a butterfly wedge, a corresponding recess in the detachable tire flange at its terminals, and means for securing the shaft of said bolt beneath the channel-iron.

In the drawings Figure 1 is a perspective view showing a section of the tire and my improved means for attaching the tire to the wheel. Fig. 2 is a cross-section of the tire and rim showing the means for locking the flange-bearing ring to the channel-iron. Fig. 3 is a side view of the tire and rim showing details of construction. Fig. 4 is a perspective view of the channel-iron, the terminals of the split ring, the locking bolt, and the strut designed to receive said bolt and to form a bearing for its nut.

I have shown my device as applied to a rim of the clencher type in which the flanges are curved upwardly and inwardly to grasp and hold beads formed upon the tire casing, but it will be obvious to those skilled in the art that by altering the shape of the tire flanges my device can be adapted for use with tires of any form.

Referring to the drawings 1 is the felly of the wheel, the channel-iron 2 being adapted to be attached thereto by rivets or other suitable means. Formed upon or permanently fixed to this channel-iron is the flange 3 designed to engage and retain one edge of the tire. At its outer edge the channel-iron is extended laterally and the portion beyond the wheel felly preferably has a slight downward tendency toward the hub of the wheel. This edge terminates in a retaining flange 4 extending entirely about its periphery, forming a seat for the removable ring 5 and securing it against laterally outward displacement. The form of this portion of the channel-iron may of course be varied; for example, it may have a downward offset instead of the inclined portion, but the essential feature is that the upper edge of the retaining flange must be on a level with or below the surface of the main portion of the rim so that a tire may be slipped over it without stretching. The form of the retaining flange is likewise immaterial except that the flange or its equivalent must form a seat for the removable ring adapted to secure it from laterally outward movement. The ring 5 is continuous except at a single point where it is split, this joint allowing it to be attached or removed at will. The ring comprises a base portion and a tire retaining flange, the base portion being formed to fit within the seat upon the channel-iron in such a manner that when it is seated the tire flange is in position to engage the tire. Downwardly through the contacting surfaces of the terminals of the split ring extends a hole registering with a corresponding hole in the channel-iron and beneath the channel-iron at this point is placed a removable strut 6, which is also provided with a hole registering with the other two. The upper edge of the ring terminals is cut away to form a butterfly shaped recess 7, one-half of which is formed in each terminal. A bolt 8 is provided having a head 9 corresponding in shape to the recess in the ring terminals and adapted to form a continuous part of the split ring flange when seated within the recess. The shaft of this bolt is adapted to be inserted through the holes in the channel-iron and strut and is threaded along its lower extremity to engage with a nut 11. The form of this recess and of the head of the bolt may be varied but its shape must be such that it secures the ring terminals to one another and to the channel-iron. The essential feature is that in each half of the recess there must be provided a secondary recess or indentation 10 extending to a point below the portion of the main recess 7 on either side of it. The corresponding portion upon the bolt head fitting within this prevents longitudinal movement of the ring terminals.

I have shown in the drawings a practical embodiment of my device but I do not wish to be understood as limiting myself to the precise form shown.

The strut may be dispensed with by forming that portion of the lower surface of the channel-iron to provide a seat for the nut. If desired both tire flanges may be made removable by duplicating the split ring and the attaching means but in practice this is usually found to be unnecessary and undesirable. Again, the ring may be constructed in several sections by providing similar locking means at the various joints and with large and heavy structures this may be found advantageous.

The mode of operation of my device is as follows: To attach a tire the split ring is removed and the tire applied to the rim engaging closely with the permanent tire flange about the entire periphery of the wheel. The split ring is then sprung into place about the channel-iron inside the retaining flange and the ring terminals drawn closely together in longitudinal alinement. The bolt is then thrust downwardly through the holes provided for it and its head seated firmly in the recess in the ring terminals. The nut is then engaged with the bolt and screwed up against the strut. In this position the split ring is securely locked to the rim and the tire firmly held thereby. The retaining flange upon the channel-iron prevents laterally outward movement of the split ring and the wedge-headed bolt pins the terminals to the channel-iron. To remove the tire this process is reversed. The nut is unscrewed, the bolt drawn upward, whereupon the split ring can be easily detached and the tire removed.

The split ring should be accurately fitted to the channel-iron and in consequence it may be found difficult to pull the terminals together so that the bolt can be properly seated. To facilitate this operation I provide the jointed lever 12. A pin 13 upon one arm is inserted in a hole 14 provided in the split ring near one terminal and the pin 15 upon the second lever arm is inserted in a hole 16 in the other split ring terminal. Thereupon by a pull upon the lever the terminals can be made to contact so that the bolt can be seated.

Having described my invention what I claim is:

1. A two-part rim for vehicle wheels comprising one member seated upon the wheel felly and provided with a retaining seat for the second member; said second member comprising a transversely split ring carrying a tire retaining flange; and means for pinning said second member to said first member, consisting of a bolt having a butterfly shaped head adapted to seat within a recess common to the terminals of the second member, and a shaft adapted to pass through said first member and to engage with a nut seating therebeneath.

2. Means for securing a detachable cross-split tire flange to the channel-iron of a vehicle wheel rim comprising a retaining seat upon said channel-iron, and a bolt for pinning the terminals of said flange to the said channel-iron; said bolt having a shaft adapted to pass through the said channel-iron and to engage with a nut therebeneath, and a flaring head formed to enter a recess common to the flange terminals and shaped to form a part of the tire flange at that point, the lateral edges of the said bolt-head being provided with upwardly extending recesses corresponding to projections formed upon the flange terminals, substantially as shown and described.

3. Means for securing a removable cross-split tire flange to the channel-iron of a vehicle wheel rim, comprising a bolt having a flaring head, the lateral edges of which are provided with upwardly extending recesses, a nut adapted to engage the shaft of said bolt and to seat beneath the channel-iron, and a recess common to the flange terminals shaped to receive the bolt head.

EDWIN COUPLAND SHAW.

Witnesses:
C. C. GOODRICH,
W. K. MEANS.